Sept. 5, 1933.  E. E. WICKERSHAM  1,925,356
HARVESTER CONSTRUCTION
Filed Oct. 31, 1930
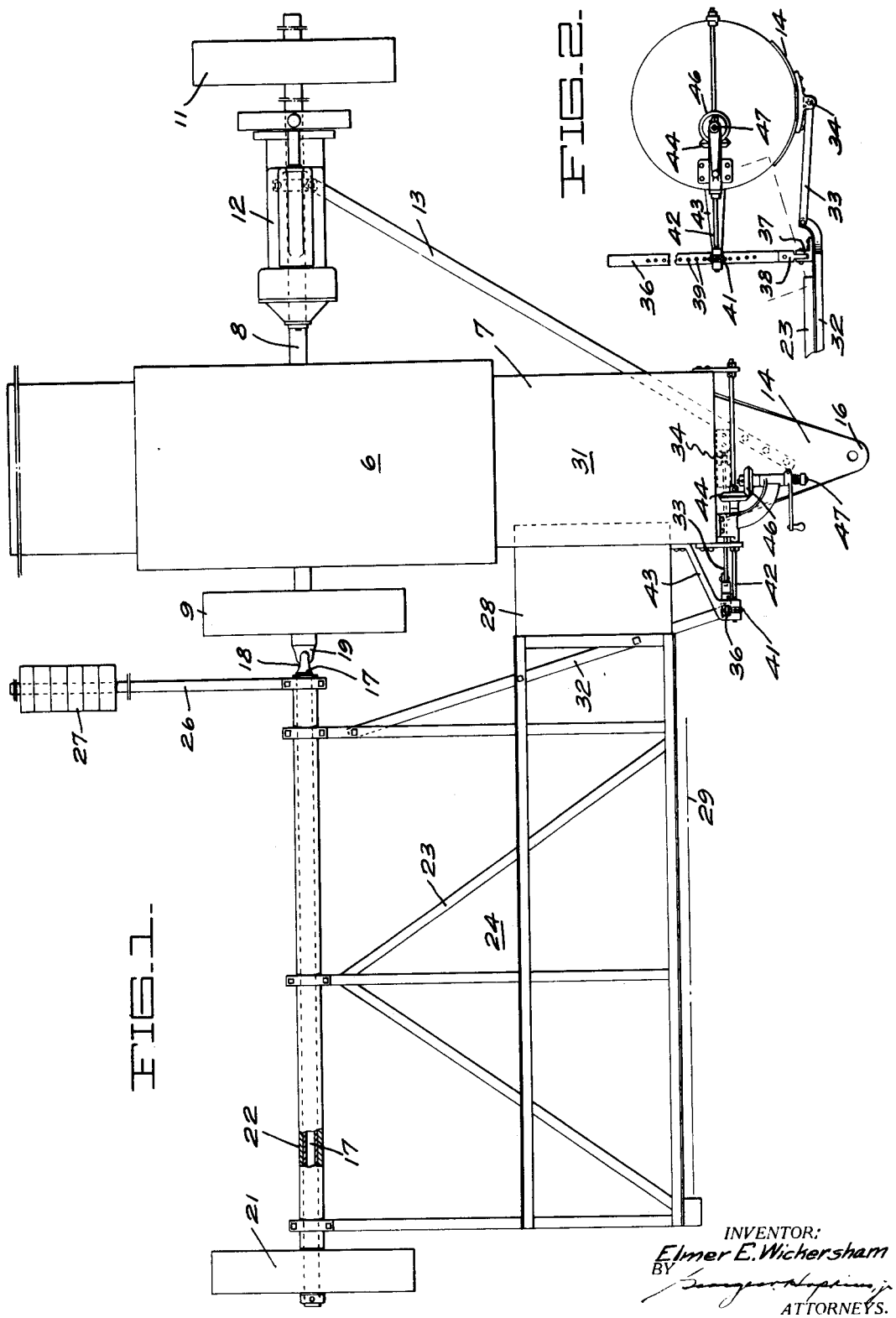
INVENTOR:
Elmer E. Wickersham
BY
ATTORNEYS.

Patented Sept. 5, 1933

1,925,356

UNITED STATES PATENT OFFICE 1,925,356

HARVESTER CONSTRUCTION

Elmer E. Wickersham, San Leandro, Calif., assignor to Caterpiller Tractor Co., San Leandro, Calif., a corporation of California Application October 31, 1930. Serial No. 492,497

33 Claims. (Cl. 56—20)

My invention relates to harvesting machinery and particularly to combined harvesters which usually comprise a separator unit and a header unit which are adapted to be joined and propelled over a field of standing grain to cut the grain and thresh the grain kernels from the grain straw. In the usual practice, the header unit and the separator unit are two separate and complete vehicles which are joined together by relatively loose connections for use in the harvesting operation before and after which they are usually dismantled and separately conveyed and stored. Due to the peculiar location and configuration of these two units, it is usually a relatively difficult matter to impart the draft of the propelling unit to each of the header and separator units in such a fashion that the total vehicle is propelled in a straight course and with an even distribution of surface. Ordinarily a push pole is employed extending from the outboard end of the header to the rear portion of the separator frame to withstand some of the stresses which are set up due to the propelling of the combined vehicle and which in turn transmit these stresses through the separator unit framework.

An object of my invention is to provide a harvesting construction in which the separator framework is largely relieved of draft stresses originating in the header unit.

Another object of my invention is to provide a harvester construction in which the draft stresses are transmitted almost directly to the header unit.

Another object of my invention is to provide a quickly releasable and engageable attachment between the separator and header units of a combined harvester which at the same time couples them in a satisfactory manner for propulsion over a field.

The foregoing and other objects are attained in the embodiment of the invention shown in the drawing, in which Fig. 1 is a plan of a combined harvester constructed in accordance with my invention.

Fig. 2 is a view showing in front elevation a portion of the combined harvester illustrated in Fig. 1.

In its preferred form, the harvester construction of my invention includes a main frame having draft connections thereon and a header frame extending transversely of the main frame and connected thereto by a transverse link which is subject normally to extension.

In the form of my invention which is disclosed herein, there is preferably provided a separator unit 6 having a suitable frame 7 which is mounted on a transverse axle 8 carrying ground engaging wheels 9 and 11. The frame 7 is of the character disclosed in my copending application, Serial No. 246,697, filed January 14, 1928, and consists essentially of a tubular metallic shell which serves as the sole or main frame of the machine and which also serves as a support for threshing mechanism mounted within the shell. A lateral extension of the axle 8 serves as a support for an engine 12 which supplies the power for driving the various mechanisms in the machine. A link 13 extends from the axle at a point substantially below the engine to a forwardly extending draft connection 14 attached to the main frame 7 and provided with an eye 16 for the attachment of a draft mechanism such as a tractor.

Extending on the opposite side of the main frame 7 is a tubular axle 17 which at its inner extremity carries the hook 18 loosely engaging in an eye 19 provided on the extremity of axle 8 adjacent wheel 9. At its outboard end, axle 17 carries an outboard ground engaging wheel 21. Journalled on axle 17 is a surrounding tube 22 forming part of and a support for a framework 23 of the header unit generally designated as 24. The header unit is preferably balanced by a rearwardly extending balance beam 26 which is securely fastened to the tube 22 and at its rearmost extremity carries counterweights 27. At its forward end and balanced by the weights 27 is the customary header structure including the framework for a draper 28 and a sickle bar 29. The extension 28 of the draper is intended to extend into the feeder house portion 31 of tubular main frame 7. The header and separator units are intended to be propelled over a field in the direction of the longitudinal axis of the separator unit 6 by virtue of the draft connection 14. In order to obviate the necessity of providing push poles and other similar devices which operate under compression and which must therefore be relatively rigid and also to avoid unduly stressing the framework of the separator unit 6, I preferably provide an extension 32 securely affixed to the framework 23 and projecting forwardly therefrom toward the draft connection 14. At its forward end the extension 32 is perforated to receive pivotally a transversely extending link 33. The other end of the link is likewise pivotally connected as at 34 to the draft connection 14 of the separator unit 6. The link 33 is thus capable of considerable movement in a vertical plane about its two pivotal axes to allow for rising and falling movement of the header unit with respect to the separator unit and at the same time as the combined vehicle is propelled over the field, the force exerted on the link 33 is one normally of tension. Furthermore the drag due to the presence of the header unit is transmitted almost directly to the draft connection 14 so that the main frame 7 of the separator unit is largely unstressed due to this cause.

In order to obtain relative vertical adjustment of the separator unit with respect to the header unit, I provide on the forward extension 32 a vertically elongated rack 36 which at its lower end is provided with a pair of pivotal connections 37 and 38 to allow considerable flexibility in movement. Engaging in apertures 39 formed in the rack 36 is a pinion 41 formed on the end of a shaft 42 held in bracket 43 secured to the framework 7 of the separator unit. The other end of shaft 42 likewise carries a bevel gear 44 meshing with a similar bevel gear 46 on a crank shaft 47 so that by revolving the crank the pinion 41 is rotated to raise and lower the header framework 23 with respect to the separator framework 7. The connections employed and their relatively lose fit are such as to permit any degree of adjustment within the range of the machine.

In accordance with the construction disclosed herewith, it is possible to provide a quickly attachable and detachable header and separator unit which can be propelled over the field with the minimum of strain on the machinery and which simplifies considerably the structure and which also reduces the weight of the structure due largely to the fact that one small unit is placed in tension rather than a large unit being placed in compression.

It is understood that I do not limit myself to the form of the harvester construction shown and described herein, as the invention, as set forth in the following claims, may be embodied in a plurality of forms.

I therefore claim as my invention:

1. A harvester construction comprising a main frame, a draft connection on said main frame, a header frame extending transversely from said main frame, a pivotal connection between said header frame and said main frame, and a transverse link pivoted at one end to said header frame and pivoted at the other end directly to said draft connection.

2. A harvester construction comprising a main frame including a draft connection, a header frame pivoted to said main frame, and a transverse link pivoted at one end directly to said draft connection and pivoted at the other end to said header frame.

3. A harvester construction comprising a main frame, a supporting axle for said main frame, a draft connection on said main frame, a header frame pivoted to said supporting axle, an extension on said header frame toward said draft connection, means for raising and lowering said header frame with respect to said main frame, and a link connected directly to said draft connection and to said extension.

4. A harvester construction comprising a main frame, a draft connection, a header frame pivoted to said main frame and means for preventing pivotal movement including a transverse link pivotally connected directly to said draft connection and said header frame.

5. A harvester construction comprising a main frame, a draft connection at the forward end of said main frame, a supporting axle on said main frame, a header frame extending transversely of said main frame, a pivotal connection between said header frame and said main frame, a forward extension on said header frame, and a transverse link connected to said forward extension and directly to said draft connection.

6. In a combined harvester thresher, a main frame, a jointed supporting axle, a draft connection, and means to transmit draft forces directly from said draft connection to said axles independently of said main frame.

7. In a threshing machine, a main frame, a main axle support therefor, a draft connection attached to said main frame, and draft transmitting means interconnecting said draft connection and said axle independently of said main frame.

8. In a combined harvester thresher having a body, a main two-wheeled axle, an axle connected thereto, a draft connection, and means to link said axles with said connection independently of said body.

9. In a threshing machine, a main frame, an axle support therefor, a draft connection thereto, and means to link said axle with said connection independently of said main frame.

10. In a combined harvester thresher, a main frame, an auxiliary frame connected to said main frame for movement vertically relatively thereto, a draft connection to said main frame, and means to link said auxiliary frame directly with said connection.

11. In a harvester thresher, a main frame and axle for carrying threshing mechanism, an auxiliary frame and axle for carrying harvesting mechanism, means to connect said axles, a draft connection, and means to link said draft connection with said axles independently of said main frame.

12. In a harvester thresher, a main frame for carrying threshing mechanism, an auxiliary frame for carrying harvesting mechanism, a draft connection attached to the main frame, and means to link said auxiliary frame with said draft connection independently of said main frame.

13. In a harvester thresher, a main frame and axle for carrying threshing mechanism, an auxiliary frame and axle for carrying harvesting mechanism, means to connect said axles, and a draft connection attached to both said frames and to said first axle.

14. In a combined harvesting and threshing machine having a draft connection and a header, means connected directly to said connection to pull said header.

15. In a combined harvesting and threshing machine having a draft connection member and a header frame member, means connected directly with said draft connection member and interconnecting said members to permit relative vertical movement.

16. In a combined harvesting and threshing machine having a draft connection member and a header frame member, means connected directly with said draft connection member and interconnecting said members to permit relative vertical movement and to substantially prevent relative horizontal displacement.

17. A harvester construction comprising a main frame, a draft connection thereon, a header frame pivoted to said main frame, a member hinged on said draft connection and on said header frame, and means for controlling said member to control the position of said header frame.

18. A harvester construction comprising a main frame, a draft connection thereon, a header frame pivoted to said main frame, a member hinged on said draft connection and on said header frame, and rack and pinion means for controlling said member to control the position of said header frame.

19. In combination, a first axle, ground engaging means thereon, a second axle pivoted to said first axle, a draft connection, a link between said first axle and said draft connection, and another link between said draft connection and said second axle.

20. In a vehicle having a main frame, an axle support therefor, an auxiliary frame, an axle support for said auxiliary frame, a draft connection, and means connecting said axle supports to said draft connection independently of said main frame.

21. In a vehicle having a frame, an axle support therefor, an auxiliary frame, an axle support for said auxiliary frame, a draft connection, and separate means connecting said axle supports to said draft connection.

22. A harvester construction comprising a main frame, a header frame extending transversely from said main frame and movably connected thereto at a predetermined location, a member forwardly of said location, and means connecting the member to the header frame and adjacent the main frame, the member being pivoted for movement in an upright plane.

23. A harvester construction comprising a main frame, a header frame extending transversely from said main frame, a pivotal connection between said header frame and said main frame, said header frame having an extension forwardly of said connection, a transverse link pivoted at one end to said extension, and means including a pivotal connection at the other end of said link for connecting the link adjacent said main frame.

24. A harvester construction comprising a main frame, a header frame extending transversely from said main frame, a pivotal connection between said header frame and said main frame, said header frame having an extension forwardly of said connection, a transverse link mounted for movement in an upright plane, and means pivoting the link to the extension and adjacent the main frame.

25. A harvester construction comprising a main frame, a header frame extending transversely from said main frame, a pivotal connection between said header frame and said main frame, said header frame having an extension forwardly of the connection, a transverse link mounted for movement in an upright plane, means pivoting the link to the front of the extension, and means pivoting the link adjacent the front of the main frame.

26. A harvester construction comprising a main frame, a header frame extending transversely therefrom, means for mounting the header frame for pivotal adjustment about a substantially horizontal axis, means including a link connecting the main frame and the header frame, said link being mounted for movement in an upright plane to allow pivoting of the header about said axis, a member on the main frame, a member on the header frame, and adjustable means connecting said members to hold the header frame in a selected position.

27. A harvester construction comprising a main frame, a header frame extending transversely from said main frame, a draft connection on said main frame, and a link pivotally mounted for movement in an upright plane, said link being connected to the header frame and to the draft connection independently of said main frame.

28. A harvester construction comprising a main frame, a header frame extending transversely from said main frame at one side thereof, a draft connection attached to said main frame, means including a member extending from said header frame and connected to said draft connection at one side of the main frame, and means including a second member connected at the opposite side of said main frame and to the draft connection, said means serving to relieve the main frame of stresses.

29. A harvester construction comprising a main frame, an axle support for the main frame, a header frame including an axle connected to said main frame axle, a draft connection attached to the main frame, and means including forwardly extending members, each connected with an axle and to the draft connection, said means serving to relieve the main frame of draft stresses.

30. A harvester construction comprising a shell constituting a main frame, an axle support for the shell, a header frame including an axle attached to the main frame axle, a draft connection attached to the main frame, and means connecting the header frame directly to the draft connection.

31. A harvester construction comprising a shell constituting a main frame, a header frame extending transversely from the main frame, a draft connection attached to the main frame, and means connecting the header frame directly to the draft connection.

32. A harvester construction comprising a main frame, a draft connection adjacent the forward end of said main frame, an auxiliary frame, ground-engaging members for said frames, means for movably connecting said auxiliary frame to said main frame at a location rearwardly of said draft connection, and means for connecting said auxiliary frame to said main frame at another location forwardly of said first-mentioned location, said latter means being connected with said auxiliary frame and also with said draft connection independently of said main frame.

33. A harvester construction comprising a main frame, a ground-engaging support therefor including an axle upon which the main frame is mounted, an auxiliary frame movably connected to said main frame at a location intermediate the ends of said main frame, a ground-engaging support for said auxiliary frame, a draft connection connected to said main frame adjacent its forward end, means for connecting said auxiliary frame to said main frame at another location forwardly of said first-mentioned location, said latter means including linkage at one side of said main frame connected with said auxiliary frame and also with said draft connection independently of said main frame, and a link member at the other side of said main frame connected to said axle and to said draft connection independently of said main frame.

ELMER E. WICKERSHAM.

CERTIFICATE OF CORRECTION.

Patent No. 1,925,356.  September 5, 1933.

ELMER E. WICKERSHAM.

It is hereby certified that error appears in the printed specifications of the above numbered patent requiring correction as follows: In the heading to the printed specification, line 4, for "Caterpiller Tractor Co." read Caterpillar Tractor Co.; and that the said Letters Patent should be read with this correction therein that the same may conform to the record of the case in the Patent Office.

Signed and sealed this 12th day of December, A. D. 1933.

F. M. Hopkins

Acting Commissioner of Patents.

(Seal)